United States Patent [19]

Nemser et al.

[11] Patent Number: 5,051,114
[45] Date of Patent: Sep. 24, 1991

[54] PERFLUORODIOXOLE MEMBRANES

[75] Inventors: Stuart M. Nemser; Ian C. Roman, both of Wilmington, Del.

[73] Assignee: Du Pont Canada Inc., Mississauga, Canada

[21] Appl. No.: 538,066

[22] Filed: Jun. 13, 1990

Related U.S. Application Data

[63] Continuation-in-part of Ser. No. 366,400, Jun. 15, 1989, abandoned.

[51] Int. Cl.$^5$ .................. B01D 53/22; B01D 71/32
[52] U.S. Cl. ........................ 55/16; 55/68; 55/158
[58] Field of Search ............. 55/16, 68, 158; 526/247

[56] References Cited

U.S. PATENT DOCUMENTS

| | | | |
|---|---|---|---|
| 3,308,107 | 3/1967 | Selman et al. | 55/16 X |
| 3,488,335 | 1/1970 | Braun | 526/247 |
| 3,865,845 | 2/1975 | Resnick | 526/247 X |
| 3,978,030 | 8/1976 | Resnick | 526/247 |
| 4,399,264 | 8/1983 | Squire | 526/247 |
| 4,431,786 | 2/1984 | Squire | 526/247 |
| 4,530,569 | 7/1985 | Squire | 526/247 X |
| 4,553,983 | 11/1985 | Baker | 55/16 |
| 4,565,855 | 1/1986 | Anderson et al. | 526/247 |
| 4,594,399 | 6/1986 | Anderson et al. | 526/247 |
| 4,754,009 | 6/1988 | Squire | 526/247 |

FOREIGN PATENT DOCUMENTS

| | | | |
|---|---|---|---|
| 0111343 | 6/1984 | European Pat. Off. | 526/247 |
| 0181850 | 5/1986 | European Pat. Off. | 55/158 |

OTHER PUBLICATIONS

Roberts et al., "Recovery of Freon Gases with Silicon Rubber Membranes", *Ind. Eng. Chem. Process Design Dev.*, 25 (1986), pp. 971-973.

Baker et al., "Separation of Organic Vapors from Air", *Journal of Membrane Science*, 31 (1987), pp. 259-271.

*Primary Examiner*—Robert Spitzer
*Attorney, Agent, or Firm*—Craig H. Evans

[57] ABSTRACT

A selectively permeable membrane for the separation or enrichment of gaseous mixtures may be formed from amorphous polymers of perfluoro-2,2-dimethyl-1,3-dioxole, especially copolymers with a complementary amount of at least one of tetrafluoroethylene, perfluoromethyl vinyl ether, vinylidene fluoride and chlorotrifluoroethylene. Preferably, the polymer is a dipolymer containing 65-99 mole % of perfluoro-2,2-dimethyl-1,3-dioxole and having a glass transition temperature of at least 140° C. The membranes may be used for the separation or enrichment of a wide variety of gaseous mixtures, including oxygen enrichment of air, and separation or enrichment of gaseous organic compounds in admixture with air, including separation or enrichment of the amount of fluorocarbon gases in air. The membranes exhibit a very high flux rate, compared with other glassy organic polymer membranes.

41 Claims, 1 Drawing Sheet

PERFLUORODIOXOLE MEMBRANES

This is a continuation-in-part of Application Ser. No. 07/366,400, filed 1989 June 15, now abandoned.

FIELD OF THE INVENTION

The present invention relates to selectively permeable membranes formed from a polymer, especially a dipolymer, of a perfluorodioxole. The membranes may be used in a variety of end-uses, two examples of which are oxygen enrichment of gaseous admixtures of oxygen and nitrogen e.g. air, and enrichment of the amount of gaseous organic compounds in admixtures with oxygen and/or nitrogen e.g. air. In embodiments, the gaseous organic compound may be a gaseous fluorocarbon or a volatile organic compound.

BACKGROUND TO THE INVENTION

Methods for the enrichment and/or separation of gaseous organic compounds from gaseous admixtures, including gaseous admixtures with oxygen and/or nitrogen e.g. air, are known. For example, D. L. Roberts and G. D. Ching discuss the recovery of fluorocarbon gases using silicone rubber membranes, specifically a silicone rubber on a polysulfone backing, in I&EC Process Design and Development, 1986, 25 971. It was found that the permeability of gaseous fluorocarbons varied substantially with the structure of the fluorocarbon, with some fluorocarbons exhibiting greater permeability through the membrane than nitrogen whereas other fluorocarbons exhibited lower permeability than nitrogen. For example, whereas carbon tetrafluoride exhibited a permeability through the silicone rubber membrane that was 15 times less than that of nitrogen, the permeability of dichlorodifluoromethane i.e. the fluorocarbon available commercially as Freon® 12, was greater than that of nitrogen.

A process for the recovery and concentration of organic vapours from a stream of air containing no more than 20 000 ppm of the organic vapour is described in U.S. Pat. No. 4 553 983 of R. W. Baker et al, which issued 1985 Nov. 19. Such a process requires a selectivity for the organic vapour over air, as measured by nitrogen, of at least 50. The membrane that was exemplified was a silicone rubber membrane. Separation of organic vapours from air is also discussed by R. W. Baker et al in Journal of Membrane Science 31 (1987) 259–271.

Copolymers of perfluoro-2,2-dimethyl-1,3-dioxole, especially dipolymers with tetrafluoroethylene, are known for use as cladding materials in optical fibre constructions as well as certain electronics applications, and as moulded articles and films. Such dipolymers and uses thereof are described in U.S. Pat. No. 4 754 009 of E. N. Squire, which issued 1988 June 28, as well as in U.S. Pat. No. 4 530 569 of E. N. Squire, which issued 1985 July 23. Perfluorinated dioxole monomers and polymers are disclosed in U.S. Pat. No. 4 565 855 of B. C. Anderson, D. C. England and P. R. Resnick, which issued 1986 Jan. 21.

Films formed from polymers containing fluorine and having a ring structure in the main polymer chain are disclosed in published Japanese patent application No. 63 60 932 of Asahi Glass KK, published 1988 Oct. 27. The films have a thickness of less than 50 microns. Gas or liquid selectively permeable membranes formed from fluoropolymers having a ring structure in the main polymer chain are disclosed in published Japanese patent application No. 63 264 101 of Asahi Glass KK, published 1988 Nov. 01. The membrane that is exemplified was formed from perfluoroallyl vinyl ether and had fluxes, in $cm^3 \cdot cm/cm^2 \cdot sec \cdot cm\, Hg$ (Barrers), as follows: $He = 106$; $H_2 = 26$; $CO_2 = 8.2$; $O_2 = 3.9$; $N_2 = 0.87$ and $CH_4 = 0.24$. The separation coefficients were calculated to be as follows: $O_2/N_2 = 4.4$; $CO_2/CH_4 = 35$; $He/CH_4 = 452$; $He/N_2 = 122$ and $H_2/N_2 = 30$.

SUMMARY OF THE INVENTION

A selectively permeable membrane that may be used in, for example, oxygen enrichment of gaseous admixtures containing oxygen and in the enrichment of gaseous organic compounds in admixture with oxygen and/or nitrogen e.g. air, has now been found. The membrane exhibits preferential permeability of oxygen at a high flux rate.

Accordingly, the present invention provides a selectively permeable membrane for the separation of gaseous mixtures, said membrane being formed from an amorphous polymer of perfluoro-2,2-dimethyl-1,3-dioxole and exhibiting an oxygen/nitrogen selectivity of at least 1.4.

In a still further embodiment, the membrane is a supported membrane, in the form of a film or coating on a porous support, or in the form of a hollow fibre.

The present invention further provides a membrane separation device containing a selectively permeable membrane formed from an amorphous polymer of perfluoro-2,2-dimethyl-1,3-dioxole.

In another embodiment, the membrane is a supported membrane.

In addition, the present invention provides a method for the enrichment of the amount of a gaseous organic compound in a gaseous admixture of said organic compound and at least one of oxygen and nitrogen, said method comprising:

(a) providing in a membrane separation cell a selectively permeable membrane having a feed side and a permeate side, said membrane having an oxygen/nitrogen selectivity of at least 1.4 and formed from an amorphous polymer of perfluoro-2,2-dimethyl-1,3-dioxole, and feeding said admixture to the feed side of said membrane, said membrane being at a temperature of less than the glass transition temperature of the polymer;

(b) optionally applying a pressure differential across the membrane; and (c) removing from the feed side of the membrane, a gaseous admixture of said organic compound that is enriched in the amount of organic compound.

In a preferred embodiment of the method of the present invention, the selective permeation of nitrogen over the organic compound is at least 10:1.

In a further embodiment, the organic compound is a gaseous fluorocarbon.

In another embodiment, the organic compound is a hydrocarbon.

Furthermore, the present invention provides a method for the enrichment of the amount of a gas in a gaseous admixture with another gas, especially oxygen in a gaseous admixture of oxygen and nitrogen, said method comprising:

(a) providing in a membrane separation cell a selectively permeable membrane having a feed side and a permeate side, said membrane having an oxygen/nitrogen selectivity of at least 1.4 and formed from an amorphous polymer of perfluoro-2,2-dimethyl-1,3-dioxole, and feeding said admixture to the feed side of said membrane, said membrane being at a temperature of less than the glass transition temperature of the polymer;

(b) optionally applying a pressure differential across the membrane; and (c) removing from the permeate side of the membrane, a gaseous admixture that is enriched in the amount of one gas.

In a preferred embodiment of the method of the present invention, the selective permeation of oxygen over nitrogen is at least 1.7:1.

In preferred embodiments of the membranes and methods of the present invention, the polymer is a copolymer of perfluoro-2,2-dimethyl-1,3-dioxole, especially a copolymer having a complementary amount of at least one monomer selected from the group consisting of tetrafluoroethylene, perfluoromethyl vinyl ether, vinylidene fluoride and chlorotrifluoroethylene.

In other embodiments, the polymer is a homopolymer of perfluoro-2,2-dimethyl-1,3-dioxole.

In further embodiment, the polymer is a dipolymer of perfluoro-2,2-dimethyl-1,3-dioxole and a complementary amount of tetrafluoroethylene, especially a dipolymer containing 65-99 mole % of perfluoro-2,2-dimethyl-1,3-dioxole and having a glass transition temperature of at least 140° C.

BRIEF DESCRIPTION OF THE DRAWINGS

The present invention is illustrated by the embodiment shown in the drawing in which.

DESCRIPTION OF THE INVENTION

Figure 1:
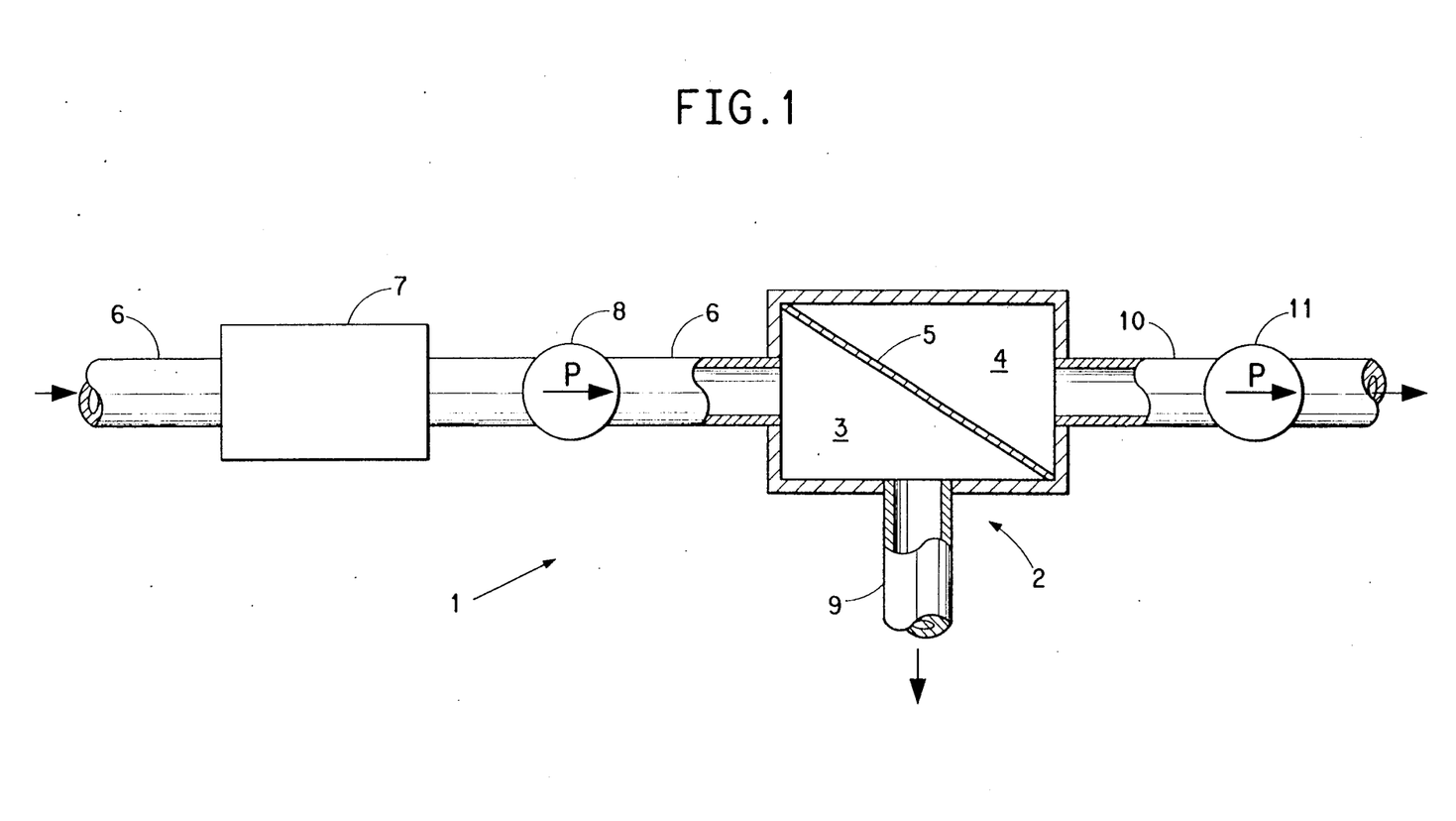
FIG. 1 is a schematic representation of a process for the separation of gaseous mixtures using a selectively permeable membrane.

Apparatus for a membrane separation process is schematically illustrated in FIG. 1. In that apparatus, shown generally by 1, membrane separation cell 2 has a feed or upstream section 3 and a permeate section 4 that are separated by selectively permeable membrane 5. Feed section 3 has connected thereto an inlet pipe 6 which, as shown, has an oven 7 for heating a gaseous mixture being fed to the apparatus, and inlet pump 8. In addition, inlet section 3 has connected thereto an outlet pipe 9. Permeate section 4 is connected to outlet transfer line 10 that in the embodiment shown has an outlet pump 11.

In operation, a gaseous admixture is fed through inlet pipe 6 to feed section 3 of membrane separation cell 2. The gaseous admixture may be at ambient temperature but pressurized to above atmospheric pressure by inlet pump 8; however, the gaseous admixture may be heated by means of oven 7. After a period of time, a hold-up time which will depend primarily on the flow rate of the gaseous admixture and the volume of the feed section, the portion of the gaseous admixture that has not passed through the selectively permeable membrane 5 will pass from the feed section 3 by means of outlet pipe 9. Outlet pipe 9 may, in turn, be the inlet pipe of apparatus for further enrichment of the gaseous admixture or other process capable of using the gaseous admixture.

The gaseous material passing through the selectively permeable membrane passes from permeate section 4 through outlet transfer line 10 which as shown contains a pump 11; pump 11 will preferably be a pump capable of imparting a partial vacuum to the permeate section. Outlet transfer line 11 might be vented directly or indirectly to the atmosphere, or be the feed pipe for another process; as described herein, the gaseous admixture in outlet transfer line 10 will have substantially less of the gaseous organic compound than the inlet feed stream, and it might be environmentally acceptable to vent outlet transfer line 10 to the atmosphere.

As will be appreciated by persons skilled in the art, the feed section of the membrane cell may be pressurized i.e. be at a pressure above atmospheric pressure, and/or the permeate section may be partially evacuated i.e. be at a pressure below atmospheric pressure. In one preferred embodiment, the feed section is above atmospheric pressure and in another preferred embodiment, the permeate section is partially evacuated. Alternatively, there may be no pressure differential per se, but rather a concentration differential with diffusion across the membrane.

The selectively permeable membrane is formed from an amorphous polymer of perfluoro-2,2-dimethyl-1,3-dioxole. In embodiments, the polymer is a homopolymer of perfluoro-2,2-dimethyl-1,3-dioxole. In other embodiments, the polymer is a copolymer of perfluoro-2,2-dimethyl-1,3-dioxole, including copolymers having a complementary amount of at least one monomer selected from the group consisting of tetrafluoroethylene, perfluoromethyl vinyl ether, vinylidene fluoride and chlorotrifluoroethylene. In preferred embodiments, the polymer is a dipolymer of perfluoro-2,2-dimethyl-1,3-dioxole and a complementary amount of tetrafluoroethylene, especially such a polymer containing 65-99 mole % of perfluoro-2,2-dimethyl-1,3-dioxole. The amorphous polymer preferably has a glass transition temperature of at least 140° C., and more preferably at least 180° C. Glass transition temperature ($T_g$) is known in the art and is the temperature at which the polymer changes from a brittle, vitreous or glassy state to a rubbery or plastic state. Examples of dipolymers are described in further detail in the aformentioned U.S. Pat. No. 4 754 009 of E. N. Squire.

The glass transition temperature of the amorphous polymer will vary with the actual polymer of the membrane, especially the amount of tetrafluoroethylene or other comonomer that may be present. Examples of $T_g$ are shown in FIG. 1 of the aforementioned U.S. Pat. No. 4 754 009 of E. N. Squire as ranging from about 260° C. for dipolymers with tetrafluoroethylene having low amounts of tetrafluoroethylene comonomer down to less than 100° C. for the dipolymers containing at least 60 mole % of tetrafluoroethylene.

Useful membrane configurations include, but are not limited to, thin film composite films and composite hollow fibres, especially in which a thin layer or coating of the amorphous polymer is supported by a porous substrate of another polymer, and monolithic film and fibre membranes. The membranes must be thin, in order to maximize the rate of gas transmission through the membrane, preferably less than 0.01 mm and especially less than 0.001 mm in thickness; in the case of composite membranes, such thickness refers to the thickness of the layer or coating of the amorphous polymer.

The membranes of the present invention may be manufactured by a variety of methods known to those skilled in the art, particularly in the light of the versatile processability of the perfluorodioxole polymers. These methods include solvent and melt film-casting and fibre-casting methods, as well as coating techniques; other fluoropolymers tend to be either melt processible but not solvent processible or not processible by either method.

The gaseous admixture fed to the membrane separation cell may be an admixture of oxygen, usually containing nitrogen and especially in the form of air, and optionally containing a gaseous organic compound. The gaseous organic compound may be a compound that is a gas at atmospheric temperature and pressure, but will more commonly be the vapour of an organic compound that is in liquid form at atmospheric pressure and temperature. The gaseous admixture will usually be at about ambient temperature but may be at higher temperatures; the membranes used in the method of the present invention are capable of being used at elevated temperature, including in some embodiments at temperatures above 100° C. However, the membranes should be used at a temperature below the glass transition temperature, and especially at least 30° C. below the glass transition temperature, of the amorphous polymer used to form the membrane. In preferred embodiments, the glass transition temperature is at least 140° C. and especially at least 180° C. The method of the present invention may be operated at relatively low temperatures e.g. as low as about 10° C., and especially about 15° C.

The gas admixture may originate from a wide variety of sources. For example, the gaseous admixture may be air, or an admixture derived from air e.g. an admixture that has been enriched in oxygen using for example the method of the present invention.

In alternative embodiments, the gaseous admixture may be an admixture of, for example, air containing an organic compound. In one embodiment, the admixture may be from a process for the manufacture of foamed materials, in which event the organic compound may be a fluorocarbon or hydrocarbon of the type used in such processes. Alternatively, the admixture may be from a dry cleaning process in which event the organic compound may be a hydrocarbon or chlorinated hydrocarbon, or from a coating process in which event the organic compound may be mixtures of aromatic and aliphatic hydrocarbons and derivatives thereof e.g. ethers, alcohols and the like. The admixture may be vapours from storage vessels or a wide variety of processes that utilize liquid or gaseous organic compounds in steps in the process. The gaseous admixtures may contain a wide range of amounts of organic compounds, but would normally contain an amount that cannot be discharged to the atmosphere because of regulatory or other reasons; such amounts might be as low as 0.01% by weight or substantially higher. Moreover, the gaseous admixture may be an admixture that has been subjected to an enrichment process according to the procedures described herein or by another method.

It will be appreciated that a wide range of organic compounds may be subjected to the method of the present invention. Examples of such compounds include fluorocarbons e.g. trichloromonofluoromethane, dichlorodifluoromethane, monochlorotrifluoromethane, trichlorotrifluoroethane, dichlorotetrafluoroethane, monochloropentafluoroethane, $CF_3CH_2F$, hydrocarbons e.g. butane, pentane, hexane, octane, cyclohexane, benzene, toluene, xylene, naphtha and other mixed hydrocarbon fractions, chlorinated hydrocarbon solvents, polar organic compounds e.g. methyl ethyl ketone, and the like.

As exemplified hereinafter, oxygen and nitrogen tend to preferentially pass through the selectively permeable membranes, with oxygen being passed in preference to nitrogen, and does so at high flux. This combination of selectivity and high flux is generally in contrast to other membranes, and provides a method for the enrichment of a gaseous admixture e.g. air, with respect to the amount of oxygen relative to the amount of nitrogen in the admixture in a manner that is believed to be of significant practical importance, and the enrichment occurs on the permeate side of the membrane. This provides a method for the enrichment of one or more gases in a gaseous admixture relative to other gases in the admixture.

In embodiments in which the gaseous admixture contains an organic compound, oxygen and nitrogen are preferentially passed through the membrane, especially at relatively low concentrations of the organic compound. Thus, the feed stream is enriched in the organic compound. This tends to be in contrast to processes known in the art e.g. the process as described in U.S. Pat. No. 4 553 983. Moreover, oxygen and nitrogen pass through the membrane at a high rate i.e. there is high flux rate, which is necessary in order that use of the membrane according to the present method be of commercial interest.

The membranes of the present invention exhibit a selectivity of oxygen over nitrogen of at least 1.4:1, and preferably at least 1.7:1. In addition, the membranes preferably exhibit a flux for oxygen of at least 100 Barrers, especially at least 200 Barrers and in particular at least 500 Barrers. For practical applications of the membranes of the invention, the membranes need to be virtually free of defects, as will be appreciated by those skilled in the art; such a requirement is understood to be embodied in the oxygen/nitrogen selectivity of at least 1.4:1.

As discussed above, the membrane may be used for the oxygen enrichment of a gaseous admixture i.e. to provide gaseous streams having a relatively high content of oxygen. Alternatively, the membranes may be used to enrich a gaseous admixture containing organic compounds with respect to the amount of organic compounds in the admixture, one example of which is separation of gaseous fluorocarbons from a process having a waste stream containing gaseous fluorocarbons, prior to discharge of the waste stream to the environment. Another example is the separation of volatile organic compounds e.g. hydrocarbons, from a stream containing such compounds. In addition, the membranes may be used to separate or enrich other gaseous mixtures, examples of which include, but are not limited to, oxygen/carbon dioxide, hydrogen/methane, hydrogen/nitrogen, carbon dioxide/methane, helium/methane, helium/nitrogen, hydrogen/carbon monoxide, ammonia/nitrogen and carbon dioxide/nitrogen. Applications include oxygen enrichment, refinery hydrocarbon recovery, ammonia purge gas treatment, natural gas dehydration, sour gas treating, helium separations, pollution control, underwater gills for diving and air treatment in, for example, shopping malls. Examples of uses of gas separation membranes are given in "Economics of Gas Separation Membranes" by R. W. Spillman, Chemical Engineering Progress Jan. 1989, pages 41-62,.

The perfluorodioxoles membranes described herein are expected to be outstanding membrane materials for membrane-based gas separations requiring high gas permeability. There are two key criteria in the selection of membrane materials for practical membrane-based gas separation viz. product flow rate and product purity. Thus, a useful membrane material should exhibit a high permeability towards one or more components and a low permeability towards the other components of the feed mixture, which is sometimes expressed as a high fast-gas permeability or flux and high selectivity, the latter being defined as the ratio of the permeability of the fast (higher permeability) and slow (lower permeability) gases. These two properties of high permeability and high selectivity are seldom found together. High permeability dipolymers generally exhibit low selectivity and high selectivity dipolymers generally exhibit low permeation or flux rates.

While many practical membrane constructions seek a balance between flux and selectivity, others rely on one or the other to achieve gas separations. For example, a high selectivity membrane dipolymer is needed for the production of 97-99% nitrogen from air in an inexpensive manner, even if the permeability is mediocre and a high membrane area is required. Conversely, a highly permeable material may be preferred for a lightweight membrane unit for the production of 23-35%, especially 23-27%, oxygen-enriched air for enhanced combustion. The examples hereinafter show that membranes of the invention are of the latter type, exhibiting exceptionally high gas permeabilities and relatively low selectivity toward most combinations of gases. The permeabilities tend to be relatively very high compared to other glassy polymers, and of the order of one to two orders of magnitude greater than known commercially available glassy polymer membrane materials. The membranes of the invention are believed to be of particular interest for applications demanding ultrahigh gas permeability.

In Examples I-IV hereinafter, gas permeation properties of the perfluorodioxole dipolymers were measured using samples of dense film membranes. The samples were cut into discs and mounted in a permeation cell, so as to form a feed gas chamber and a permeate gas chamber, the latter being operated at lower pressure.

In the air separation tests, the feed stream was compressed air, which was provided at a flow rate that was high enough to ensure a constant feed-stream composition; the permeate oxygen-enriched air was removed at atmospheric pressure. Permeate flow rate was measured by the volumetric displacement of a soap bubble in a calibrated burette, and permeate composition was determined by gas chromatography. In most of the single-gas permeation tests, the feed gas was provided at a pressure ranging from 21 kPa to 3500 kPa.

In some low pressure tests, the permeate gas flow rate was determined by measuring the rate of increase in pressure in a constant volume evacuated chamber. The permeability of the dipolymers for the gas was determined from the volume of the evacuated chamber and the thickness and surface area of the membrane.

The present invention is illustrated by the following examples.

EXAMPLE I

Membranes having a thickness of 0.25 mm were melt pressed from a dipolymer of perfluoro-2,2-dimethyl-1,3-dioxole and tetrafluoroethylene having a glass transition temperature of 253° C.

In single-gas and mixed gas permeation tests, using the permeation test method described above, the films exhibited exceptionally high permeability toward the components of air viz. 990 Barrers with respect to oxygen and 490 Barrers with respect to nitrogen; a Barrer is defined by the following formula:

$$\text{Barrer} = 10^{-10} \, [cm^3(STP).cm]/[cm^2.sec.cmHg]$$

Furthermore, it was found that the oxygen and nitrogen permeabilities were not functions of the feed pressures, nor of the membrane thickness.

Single-gas permeability of dichlorodifluoromethane (CFC-12) vapour through the films was also measured using both constant pressure and the constant volume techniques. In this instance, it was found that the permeability of CFC-12 was a strong function of the pressure applied. The results obtained are summarized in Table I.

TABLE I

| CFC-12 Pressure | CFC-12 Permeability |
|---|---|
| 124 kPa | 14 Barrer |
| 207 kPa | 75 Barrer |
| 469 kPa | 250 Barrer |

Thus, it was found that lowering the partial pressure of the CFC-12 resulted in a decrease in the permeability of the CFC-12 through the film, thus indicating that the partial pressure of the fluorocarbon was having an effect on the properties of the membrane that affected permeability.

The results obtained show that a membrane of the dipolymer of this Example when used with a mixture of CFC-12 and air i.e. a CFC-12-in-air stream, would preferentially pass the components of air to the permeate stream (in the permeate section of the cell) and enrich the retentate stream (in the upstream or feed section of the cell) with the less permeable CFC-12 vapor. If the feed CFC-12/air mixture has a low CFC-12 concentration (and thus low CFC-12 partial pressure), the CFC permeability would be expected to be low and the selectivity of $N_2$/CFC-12 to be high.

EXAMPLE II

Membranes were prepared from a dipolymer of perfluoro-2,2-dimethyl-1,3-dioxole and tetrafluoroethylene having a glass transition temperature of 166° C. using melt pressing and solvent casting techniques. The melt pressed films had a thickness of 0.25 mm and the solvent cast films had a thickness of 0.025 mm.

The solvent cast films were formed from solution (15% by weight of the dipolymer in FC-75; FC-75 is the tradename of a commercial solvent available from 3M Company, and is perfluoro (2-butyl tetrahydrofuran)). Membranes having a thickness of 0.38 mm were cast from the solution onto a glass plate and the solvent was allowed to evaporate slowly; the dry membrane of the dipolymer that was obtained had a thickness of 0.025 mm.

The films were subjected to single-gas permeation tests using the procedure described above, using air, nitrogen, CFC-12 and $CF_3CH_2F$, the latter being one of the hydrogen-containing fluorocarbons being developed as replacements for chlorofluorocarbons and referred to as HFC-134A. The results obtained are summarized in Table II.

Permeation results are summarized in Table II.

TABLE II

| Gas | Membrane Thickness | Feed Pressure | Permeability |
|---|---|---|---|
| $O_2$ | 0.250 mm | 3.55 MPa air | 350 Barrer |
| $O_2$ | 0.025 mm | 0.79 MPa air | 340 Barrer |
| $N_2$ | 0.250 mm | 3.55 MPa air | 130 Barrer |
| $N_2$ | 0.025 mm | 0.79 MPa air | 130 Barrer |
| CFC-12 | 0.025 mm | 0.17 MPa | 45 Barrer |

TABLE II-continued

| Gas | Membrane Thickness | Feed Pressure | Permeability |
|---|---|---|---|
| HFC-134A | 0.025 mm | 0.17 MPa | 20 Barrer |

The results show that, for oxygen and nitrogen, membrane thickness had no apparent effect on the permeability results obtained.

The results also indicate that the dipolymer of this Example exhibits lower permeability than the dipolymer in Example I; the latter had a higher content of perfluoro-2,2-dimethyl-1,3-dioxole. However, permeability towards the components of air is still exceptionally high, being at least two orders of magnitude higher than polytetrafluoroethylene.

EXAMPLE III

Membranes with a thickness of 0.25 mm were melt-pressed from three dipolymers of perfluoro-2,2-dimethyl-1,3-dioxole and tetrafluoroethylene of different dioxole contents and glass transition temperatures (Tg). The averaged results of air separation tests using air with a feed stream pressure of 700–3500 kPa are given in Table III.

TABLE III

| Dioxole (mole %) | Tg | Permeability $O_2$ | Selectivity $O_2/N_2$ |
|---|---|---|---|
| 66 | 166° C. | 340 Barrer | 2.6 |
| 76 | 203° C. | 380 Barrer | 2.3 |
| 86 | 253° C. | 990 Barrer | 2.05 |

In the air-separation tests, these dipolymer membranes exhibited exceptionally high $O_2$ and $N_2$ permeabilities. The membrane prepared from the lowest Tg-grade dipolymer had the highest $O_2/N_2$ selectivity, whereas the membrane prepared from the highest Tg-grade dipolymer had the highest $O_2$ permeability and lowest $O_2/N_2$ selectivity. In comparison, commercial air separation membranes formed from glassy polymers tend to be more selective but with substantially lower flux towards oxygen, with $O_2$ permeability typically ranging from about 1.3 Barrer (polysulfone) to 30 Barrer (poly 4-methylpentene); a very small proportion of known membranes or films exhibit permeabilities in excess of 100 Barrers for oxygen. The results of Table III also show that membranes of the invention may be prepared with a range of permeation properties.

EXAMPLE IV

Single-gas permeation tests were conducted using a membrane prepared from a membrane of the high-Tg dipolymer described in Example III. A number of different gases were tested. As a comparison, tests were also conducted on a membrane formed from polytetrafluoroethylene (PTFE).

A number of permeability measurements were conducted, using pressures that were generally in the range of 350–1750 kPa, it being the understanding that the permeability of the gases listed in Table IV is only a slight function of pressure in this pressure range. An exception to this understanding may be carbon dioxide, and the pressure used for this gas was 1750 kPa.

The results obtained are given in Table IV.

TABLE IV

| Gas | Permeability Dipolymer | PTFE |
|---|---|---|
| $CO_2$ | 2800 Barrer | 12 Barrer |
| He | 2700 Barrer | |
| $H_2$ | 2200 Barrer | 9.8 Barrer |
| $O_2$ | 990 Barrer | 4.2 Barrer |
| $N_2$ | 490 Barrer | 1.4 Barrer |
| Ethylene | 350 Barrer | |
| Methane | 340 Barrer | |
| Ethane | 180 Barrer | |

The results obtained illustrate the high permeability obtainable with the membranes of the present invention. Whereas the selectivity demonstrated by the dipolymer and polytetrafluoroethylene membranes are similar, and believed to be relatively typical of glassy, non-rubbery polymers, the dipolymer membranes exhibit relatively very high permeability. It is apparent that the membranes of the invention have potential in many membrane-based gas separations including, but not limited to, $H_2/CH_4$, $H_2/N_2$, $CO_2/CH_4$, $He/CH_4$, $He/N_2$, $CO_2/O_2$ and $CO_2/N_2$.

EXAMPLE V

Permeation measurements were conducted using a permeation cell that was immersed in water in a temperature-controlled water bath. The permeate from the permeation cell was passed through a sampler bulb of a gas chromatograph, to measure the composition of the permeate, and then to a soap film capillary to measure the permeate flow rate. Concentrations in gas mixtures were measured with a HP Gas Chromatograph model 5700A followed by a Spectra Physics Integrator type model SP4400. Pressure and pressure drop could be measured in the cell.

The membrane was placed on a porous sinter (pore size 15–20 microns) and held in place using two Teflon ® rings. The effective membrane area for mass transfer was 9.62 cm² (3.5 cm diameter).

When mixtures of gases were being tested, a purging stream with about 10 times the permeate flow rate was used to ensure a constant feed concentration, and the purged stream was monitored to determine the feed concentration. For measurements with single gases, the cell was purged at the beginning of each experiment for a short period of time.

Melt pressed membranes were prepared by placing polymer in a mould and heating to a temperature of about 20° C. above the glass transition temperature (Tg). When that temperature was reached, the polymer was treated by applying pressure and releasing it, using pressures of up to 50 tonnes/12.5 cm diameter of the membrane, for 5 minutes. The mould was then slowly cooled under a pressure of 40 tonnes/12.5 cm diameter, to room temperature. The resultant thick powder was transferred to the center of a flat plate covered by aluminum foil. Another aluminum foil-covered flat plate was mounted on it, without any spacer. The two plates were heated in a melt press, at minimal pressure, to a temperature of 100° C. above Tg, after which the pressure was raised to 40 tonne/12.5 cm diameter, and the sample was pressed for 10 minutes. The sample was then cooled slowly to room temperature under pressure, and the aluminum foil was peeled off carefully.

Cast membranes were prepared from solutions of the polymers in FC-75 solvent. The solution was warmed to 50°–60° C., and filtered through a 3 micron filter. The filtered solution was cast onto clean glass, and dried at ambient temperature in a dust free environment. The membrane was further dried in an oven at 80° C. for at least 2 hours, and then in an oven at 110° C. overnight.

Membranes were formed from a dipolymer of perfluoro-2,2-dimethyl-1,3-dioxole and tetrafluoroethylene having a glass transition temperature of 240° C., by solvent casting from a 2.5% solution in FC-75 solvent using the procedure described above, with the heating at 110° C. being for 12 hours. The resultant membrane was 20 micron thick.

The mixed gas fed to the permeation cell had the following composition: $N_2$ 78.25%, $O_2$ 20.67% and CFC-12 1.0%.

Further experimental details and the results obtained are given in Table V. Measurements were made at 20° C. under steady-state conditions in this and the following examples, unless stated to the contrary.

TABLE V

| Pressure | Permeability (Barrers) | | | Selectivity | |
|---|---|---|---|---|---|
| (kPa) | $O_2$ | $N_2$ | CFC-12 | $O_2/N_2$ | $N_2$/CFC-12 |
| 700 | 242 | 114 | 16 | 2.1 | 7.1 |
| 445 | 263 | 112 | 11 | 2.4 | 10.3 |

The results show that the selectivity to the fluorocarbon gas is dependent on the pressure used in the process, improving at lower pressures.

EXAMPLE VI

A membrane was made by melt pressing the polymer of Example III. The membrane was 80 micron thick and was prepared by heating to 340° C. under a total pressure of 20 tonnes total ram force. The gas used was the same mixture as used in Example V.

Further details and the results obtained are given in Table VI.

TABLE VI

| Pressure | Permeability (Barrers) | | | Selectivity | |
|---|---|---|---|---|---|
| (kPa) | $O_2$ | $N_2$ | CFC-12 | $O_2/N_2$ | $N_2$/CFC-12 |
| 790 | 592 | 299 | 40 | 2.0 | 7.5 |

The selectivity obtained was similar to that obtained in Example V, but the permeability was significantly higher.

EXAMPLE VII

The permeability of nitrogen and CFC-12 as single gases was measured using the membrane of Example V.

Further details and the results obtained are given in Table VII.

TABLE VII

| Gas | Pressure (kPa) | Permeability (Barrers) | Selectivity $N_2$/CFC-12 |
|---|---|---|---|
| CFC-12 | 140 | 26 | |
| $N_2$ | 140 | 550 | 21 |

This example, together with Example VI, illustrates the plasticizing action of fluorocarbon gases on the membranes of the invention.

EXAMPLE VIII

Membranes were formed from a dipolymer of perfluoro-2,2-dimethyl-1,3-dioxole and tetrafluoroethylene having a glass transition temperature of 160° C., by solvent casting from a 4.0% solution in FC-75 solvent, using the procedure of Example V, the membrane being heated at 110° C. for 12 hours. The resultant membrane was 10 micron thick.

The mixed gas fed to the permeation cell had the following composition: $N_2$ 78.25%, $O_2$ 20.67% and CFC-12 1.0%.

Further experimental details and the results obtained are given in Table VIII.

TABLE VIII

| Pressure | Permeability (Barrers) | | | Selectivity | |
|---|---|---|---|---|---|
| (kPa) | $O_2$ | $N_2$ | CFC-12 | $O_2/N_2$ | $N_2$/CFC-12 |
| 790 | 372 | 156 | 13 | 2.4 | 11.8 |
| 445 | 403 | 166 | 12 | 2.4 | 14.2 |

The results illustrate use of a membrane of the invention with mixed gases.

EXAMPLE IX

Membranes were prepared from a number of different polymers of perfluoro-2,2-dimethyl 1,3-dioxole, using the solvent casting method described in Example VII. The membranes were tested for permeability using the gaseous mixture of Example VII.

Further details and the results obtained are given in Table IX.

TABLE IX

| Polymer* | Pressure (kPa) | Permeability (Barrers) | | | Selectivity | $N_2$/CFC-12 |
|---|---|---|---|---|---|---|
| | | $O_2$ | $N_2$ | CFC-12 | $O_2/N_2$ | |
| A | 790 | 444 | 332 | 203 | 1.3 | 1.6 |
| | 445 | 463 | 306 | 63 | 1.5 | 4.8 |
| B | 790 | 586 | 444 | 362 | 1.3 | 1.2 |
| | 445 | 505 | 436 | 317 | 1.3 | 1.4 |
| C | 790 | 2097 | 1143 | 312 | 1.8 | 3.7 |
| | 445 | 2228 | 1165 | 211 | 1.8 | 5.5 |
| | 240 | 2200 | 1166 | 160 | 1.9 | 7.3 |

*A = Copolymer of perfluoro methyl vinyl ether and perfluoro-2,2-dimethyl-1,3-dioxole, with a $T_g$ of 139° C.; membrane thickness was 15 microns.
B = Copolymer of chlorotrifluoroethylene and perfluoro-2,2-dimethyl-1,3-dioxole, with a $T_g$ of 157° C.; membrane thickness was 13 microns.
C = Homopolymer of perfluoro-2,2-dimethyl 1,3-dioxole, with a $T_g$ of 330° C.; membrane thickness was 17 microns.

The results show that the homopolymer exhibits high permeation rates. The homopolymer and copolymer with perfluoromethyl vinyl ether exhibit significant selectivity of nitrogen over the fluorocarbon gas.

EXAMPLE X

A copolymer of perfluoro(methyl vinyl ether) and perfluoro-2,2-dimethyl 1,3-dioxole having a $T_g$ of 139° C. was solvent cast into membranes from a 10% solution of the polymer in FC-75 solvent and dried as described in Example VII. A second membrane was prepared in the same manner, except that the membrane was heated to a temperature above the $T_g$, to a temperature of 150° C. for an additional hour. Both membranes were tested with single gases.

The results obtained are given in Table X.

TABLE X

| Membrane Thickness (microns) | Temp. of Drying | Permeability $N_2$/CFC-12 | Selectivity Barrers $N_2$/CFC-12 |
|---|---|---|---|
| 55 | Below $T_g$ | 47/12 | 3.9 |

TABLE X-continued

| Membrane Thickness (microns) | Temp. of Drying | Permeability $N_2$/CFC-12 | Selectivity Barrers $N_2$/CFC-12 |
|---|---|---|---|
| 63 | Above $T_g$ | 63/18 | 3.8 |

The results show that, for the polymer from which the membrane was formed, heating the membrane above the glass transition point gave an apparent modest increase in the permeability of the membrane but did not affect the selectivity of the membrane under the conditions used.

EXAMPLE XI

Membranes formed from poly-[perfluoro(2-methylene-4-methyl-1,3-ioxolane)] i.e. polymer of the aforementioned U.S. Pat. No. 3 308 107, had been tested for permeability using a volumetric method at 25° C. Further experimental details and the results obtained are given in Table XI.

TABLE XI

| Gas | Permeability | Gas | Permeability |
|---|---|---|---|
| He | 650 Barrers | $H_2$ | 240 Barrers |
| $CO_2$* | 67 Barrers | CO | 8 Barrers |
| $CH_4$* | 2 Barrers | $O_2$* | 36 Barrers |
| $N_2$ | 10 Barrers | | |

*Results are averages of data for single gases and binary mixtures.

The results show that the polymer of U.S. Pat. No. 3 308 107 exhibit permeabilities to gases that were 2.5 to 40 times lower than those measured as described above in examples herein. A comparison with the data for the homopolymer in Table IX shows that the data obtained from the membrane of this invention is 60-110 times more permeable. Selectivities were, however, higher with the membrane of U.S. Pat. No. 3 308 107. It is believed that the permeability data for methane may be in error, being smaller than would be expected.

EXAMPLE XII

Permeability measurements were conducted on a variety of membranes, formed by melt pressing or by solvent casting. The method of measurement of permeability was that described in Example V. The gases used were nitrogen and CFC-12, the permeabilities for which were measured separately.

Further experimental details and the results obtained are given in Table XII.

TABLE XII

| Polymer* | Permeability (Barrers) $N_2$ | CFC-12 | Selectivity ($N_2$/CFC-12) |
|---|---|---|---|
| E | 555 | 26 | 21 |
| F | 2725 | 1168 | 2.3 |
| G | 63 | 18 | 3.5 |
| H | 53 | 2.5 | 21 |

TABLE XII-continued

| Polymer* | Permeability (Barrers) $N_2$ | CFC-12 | Selectivity ($N_2$/CFC-12) |
|---|---|---|---|
| J | 49 | 53 | 0.92 |

*E = Copolymer of perfluoro-2,2-dimethyl-1,3-dioxole and tetrafluoroethylene, $T_g$ = 240° C., thickness = 80 microns, formed by melt pressing, pressure used was 6 psig;
F = Homopolymer of perfluoro-2,2-dimethyl-1,3-dioxole, $T_g$ = 330° C., thickness = 24 microns, formed by solvent casting from FC-75 solvent, pressure used was 5 psig;
G = Copolymer of perfluoro-2,2-dimethyl-1,3-dioxole and perfluoromethyl vinyl ether, $T_g$ 137° C., thickness = 63 microns, formed by solvent casting from FC-75 solvent, pressure used was 5 psig;
H = Copolymer of vinylidene fluoride and perfluoro-2,2-dimethyl-1,3-dioxole, with a $T_g$ of 82° C.; thickness = 55 microns, formed by solvent casting from FC-75 solvent, pressure used was 25 psig.
Note:
at a lower pressure, no flux of CFC-12 was observed;
J = Copolymer of perfluoro-2,2-dimethyl-1,3-dioxole and tetrafluoroethylene, $T_g$ = 160° C., thickness = 200 microns, formed by melt pressing, pressure used was 5 psig.

The results show effects of comonomer on permeability and selectivity to nitrogen and CFC-12.

EXAMPLE XIII

Using procedures described above, membranes were melt pressed from a copolymer of perfluoro-2,2-dimethyl-1,3-dioxole and tetrafluoroethylene having a $T_g$=240° C. Permeation tests were conducted using mixtures of oxygen, nitrogen and a fluorocarbon gas or of nitrogen and a hydrocarbon gas.

Further experimental details and the results obtained are given in Table XIII.

TABLE XIII

| Gas Mixture | Permeability (Barrers) $N_2$ | $O_2$ | CFC | Selectivity $N_2$/CFC | $O_2$/$N_2$ | Flux (ml/sec) |
|---|---|---|---|---|---|---|
| (a) Membrane thickness 200 microns ||||||| 
| A | 505 | 1005 | 41 | 12.5 | 2.0 | 0.0152 |
| B | 255 | 480 | 4 | 61 | 1.9 | 0.0082 |
| C | 535 | 1065 | <3 | >100 | 2.0 | 0.0156 |
| D | 555 | 1080 | 37 | 15 | 1.9 | 0.0161 |
| E | 570 | 1130 | 71 | 8 | 2.0 | 0 0167 |
| F | 405 | — | 55 | 7.4 | — | 0.0100 |
| (b) Membrane thickness 80 microns |||||||
| A | 300 | 590 | 40 | 7.5 | 2.0 | 0.0217 |
| B | 215 | 450 | 15 | 14 | 2.1 | 0.0161 |
| C | 290 | 565 | 9 | 31 | 1.9 | 0.0208 |
| D | 350 | 640 | 28 | 12.5 | 1.8 | 0.0250 |
| E | 365 | 700 | 49 | 7.5 | 1.9 | 0.0263 |
| F | 385 | — | 130 | 3 | — | 0.0238 |

Note:
The membranes shown in the Table were prepared from the same polymer but in different laboratories
Gas mixture A = CFC 12 (MW = 120.9): air in ratio of 1:99
Gas mixture B = HCFC 123 (MW = 152.9): air in ratio of 0.43:99.57
Gas mixture C = CFC 114(MW = 170.9): air in a ratio of 1:99
Gas mixture D = HCFC 142b (MW = 100.5): air in a ratio of 1:99
Gas mixture E = HCFC 134a (MW = 102.0): air in ratio of 1:99
Gas mixture F = butane (MW = 58.1): nitrogen in a ratio of 1:99

The results show a correlation of increasing selectivity with increasing molecular weight of the fluorocarbon gas or hydrocarbon gas. In one of the membranes, the two highest molecular weight gases had selectivities of above 100 and 60 respectively. On the basis of the above results, it would appear that selectivity is related to molecular size, rather than whether the gas is a fluorocarbon or a hydrocarbon.

EXAMPLE XIV

A 1:1 mixture of homopolymer of perfluoro-2,2-dimethyl-1,3-dioxole and the copolymer of perfluoro- 2,2-dimethyl-1,3-dioxole and tetrafluoroethylene having $T_g$ of 240° C. was solvent cast from FC-75 solvent to give a membrane having a thickness of 95 microns after drying overnight at 110° C. Permeability measurements were conducted on the membrane using the HCFC 123/air mixture of Example XIII.

The $O_2/N_2$ selectivity obtained was 2.1 at 790 kpa, While the $N_2$/HCFC 123 selectivity was 4.3. The $O_2$ and $N_2$ permeabilities were 669 and 317 Barrers, respectively.

EXAMPLE XV

The melt pressed membranes of Example XIII were tested using single gases viz. nitrogen, toluene vapour, water vapour and butane gas, and in one instance using nitrogen saturated with toluene; the latter was achieved by passing nitrogen over the surface of liquid toluene and feeding the resultant stream to the membrane. In addition, a membrane made by solvent casting the homopolymer of perfluoro-2,2- dimethyl-1,3-dioxole was tested using butane and nitrogen. Althought the nitrogen permeabilities were measured at 790 kPa, it is known from results given above that the permeability for that gas is independent of pressure; comparison may therefore be made with the results obtained with the other gases and vapours.

The results are given in Table XV.

TABLE XV

| Vapour/ Gas | Membrane | Temp. (°C.) | Pressure Differential (kPa) | Permeability (Barrer) |
|---|---|---|---|---|
| Toluene | A | 25 | 4.1 | 0 |
| Toluene | A | 52 | 13 | 0 |
| Butane | A | 25 | 110 | 0 |
| Butane | B | 25 | 90 | 0 |
| Butane | C* | 25 | 100 | 9000 |
| Nitrogen | A | 25 | 790 | 580 |
| Nitrogen | B | 25 | 790 | 620 |
| Nitrogen | C | 25 | 790 | 1675 |
| Water | A | 70 | 32 | 3000** |
| Water | A | 25 | 3.4 | 100 |
| Nitrogen (saturated with toluene) | A | 25 | 340 | 575 |

Note:
*$O_2/N_2$ selectivity was measured on the membrane used in this test, and was found to be 1.9. This is confirmation of the integrity of the membrane
**At 25° C. and a pressure drop of 3.2 kPa, the permeability to water was considerably lower
Membrane A was the melt cast membrane of Example XIII, thickness = 200 microns Membrane B was the melt cast membrane of Example XIII, thickness = 80 microns
Membrane C was formed from the homopolymer by solvent casting, thickness = 100 microns.

The results show that very high selectivities were obtained for the melt pressed membranes, whereas the homopolymer membrane appears to be selective to butane in single gas measurements; results reported above would indicate that significantly lower selectivity could be expected with mixed gases.

EXAMPLE XVI

The effect of temperature on selectivity was measured at both ambient temperature and 6° C. using the melt pressed membranes of Example XIII. The gases used were CFC 12/air and CFC 114/air mixtures. The results are given in Table XVI.

TABLE XVI

| Gas Mixture | Temp. (°C.) | Permeability (Barrers) $N_2$ | $O_2$ | CFC | Selectivity $N_2$/CFC | $O_2$/$N_2$ |
|---|---|---|---|---|---|---|
| Membrane thickness = 200 microns | | | | | | |
| I | 25 | 505 | 1005 | 40 | 12.5 | 2.0 |
| I | 6 | 360 | 810 | 15 | 23.3 | 2.3 |
| II | 25 | 535 | 1065 | <3 | >100 | 2.1 |
| II | 6 | 405 | 860 | <3 | >100 | 2.1 |
| Membrane thickness = 80 microns | | | | | | |
| I | 25 | 300 | 590 | 40 | 7.5 | 2.0 |
| I | 6 | 270 | 535 | 19 | 14.4 | 2.0 |
| II | 25 | 290 | 555 | 9 | 31 | 1.9 |
| II | 6 | 320 | 620 | <3 | >100 | 1.9 |

Note
Gas mixture I = CFC 12/air
Gas mixture II = CFC 114/air

The results show that, under the conditions used, selectively improved at the lower temperature.

EXAMPLE XVII

Employing the procedure of Example XVI using three membranes and three different temperatures, the values in Table XVII would be obtained.

TABLE XVII

| Temp. (°C.) | Permeability (Barrers) $N_2$ | $O_2$ | CFC-12 | Selectivity $N_2$/CFC | $O_2$/$N_2$ |
|---|---|---|---|---|---|
| (a) solvent cast membrane formed from the copolymer of perfluoro-2,2-dimethyl-1,3-dioxole having a $T_g$ of 160° C. | | | | | |
| 6 | 155 | 280 | 10 | 15.5 | 1.8 |
| 25 | 185 | 370 | 13 | 14.0 | 2.0 |
| 50 | 235 | 395 | 35 | 6.7 | 1.7 |
| (b) melt pressed membrane formed from the copolymer of perfluoro-2,2-dimethyl-1,3-dioxole having a $T_g$ of 240° C. | | | | | |
| 6 | 360 | 810 | 15 | 23.3 | 2.3 |
| 25 | 475 | 915 | 37 | 12.8 | 1.9 |
| 50 | 560 | 935 | 52 | 10.7 | 1.7 |
| (c) solvent cast membrane formed from the homopolymer of perfluoro-2,2-dimethyl-1,3-dioxole | | | | | |
| 6 | 1005 | 1640 | 202 | 5.0 | 1.6 |
| 25 | 1055 | 1765 | 176 | 6.0 | 1.7 |

The values in Table XVII would indicate that the membranes may exhibit higher selectivity at lower temperatures.

EXAMPLE XVIII

A membrane of the homopolymer of perfluoro-2,2-dimethyl-1,3-dioxole was prepared using the solvent casting technique described in Example V; the membrane thickness 33 microns. It was tested for permeability using synthetic air and several single gases with a feed pressure of 790 kPa.

The results obtained are given in Table XVIII.

TABLE XVIII

| Gas | Permeability (24° C.) |
|---|---|
| He | 3600 Barrer |
| $H_2$ | 3300 Barrer |
| $O_2$ (air feed) | 1540 Barrer |
| $N_2$ (air feed) | 810 Barrer |
| $N_2$ | 830 Barrer |
| $CH_4$ | 600 Barrer |
| $C_2H_6$ | 500 Barrer |

It is believed that the permeabilities of hydrogen and helium are the highest measured with these gases, with the exception of polytrimethylsilylpropyne. The latter polymer, however, is known to have unstable gas transport properties e.g. see U.S. Pat. No. 4 859 215.

Moreover, the permeability of nitrogen in mixed gas tests was similar to the permeability of nitrogen in single gas tests, which indicates that there was no measurable interaction between copermeating oxygen and nitrogen molecules or competition for permeation paths in the polymer.

EXAMPLE XIX

The membrane of Example XVIII was tested in air separation over a broad range of feed pressures, to measure the effect of pressure on the permeability of permanent gases through the homopolymer of perfluoro-2,2-dimethyl-1,3-dioxole.

The results are given in Table XIX.

TABLE XIX

| Pressure of Feed Air | $O_2$ Flux (Barrer) | $O_2/N_2$ Selectivity |
| --- | --- | --- |
| 270 | 1500 | 1.95 |
| 450 | 1560 | 2.0 |
| 620 | 1610 | 2.0 |
| 790 | 1620 | 2.0 |
| 960 | 1610 | 1.95 |
| 1140 | 1610 | 1.95 |
| 1480 | 1610 | 1.95 |
| 1830 | 1560 | 1.9 |
| 2170 | 1550 | 1.9 |

The results confirm that the partial pressure across the membrane has little affect on the permeability of oxygen through the membrane. In addition, the membrane had a stable permeation performance; in a two week air-separation test, it continuously produced 31% oxygen from a 790 kPa air feed with no change in oxygen flux and oxygen/nitrogen selectivity. Stable permeation performance is indispensible for the application of the polymer as a practical membrane.

EXAMPLE XX

Comparative tests of oxygen permeability were carried out on membranes that had been formed from olefin polymers containing bulky rings in the backbone, to assess the effect that the ring structure may be having on the permeability of the membrane. The polymers used were (a) a membrane of a polymer known as "Zeonex" from Nippon Zeon, and (b) a copolymer disclosed in European 0 303 246 and in U.S. Pat. No. 4 320 239 by B. F. Goodrich. Oxygen and nitrogen permeabilities were measured and compared with membranes formed from dipolymers of perfluoro-2,2-dimethyl-1,3-dioxole and tetrafluoroethylene.

The results obtained are given in Table XIX. The permeabilities were measured at 30° C. using an air feed at 790 kPa pressure.

| Polymer | $T_g$ (°C.) | Permeability $O_2$ (Barrer) | Selectivity $O_2/N_2$ |
| --- | --- | --- | --- |
| (a) | 135 | 1.9 | 5.3 |
| (b) | 135 | 0.81 | 6.0 |

This example shows that the membranes of the invention exhibit much higher fluxes, by 2-3 orders of magnitude, than the olefin polymers with bulky rings that were tested.

We claim:

1. A method for the enrichment of the amount of a gaseous organic compound in a gaseous admixture of said organic compound and at least one of oxygen and nitrogen, said method comprising:
   (a) providing in a membrane separation cell a selectively permeable membrane having a feed side and a permeate side, said membrane being virtually defect-free with an oxygen/nitrogen selectivity of at least 1.4 and formed from an amorphous polymer of perfluoro-2,2-dimethyl-1,3-dioxole, and feeding said admixture to the feed side of said membrane, said membrane being at a temperature of less than the glass transition temperature of the polymer; and
   (b) removing from the feed side of the membrane, a gaseous admixture of said organic compound that is enriched in the amount of organic compound.

2. The method of claim 1 in which a pressure differential is applied across the membrane.

3. The method of claim 1 in which the temperature of the membrane is at least 30° C. lower than the glass transition temperature of the polymer.

4. The method of claim 1 in which the membrane has a selective permeation of nitrogen over the organic compound of at least 10:1.

5. The method of claim 1 in which the organic compound is a gaseous fluorocarbon.

6. The method of claim 1 in which the organic compound is a gaseous hydrocarbon.

7. The method of claim 1 in which the polymer is a copolymer of perfluoro-2,2-dimethyl-1,3-dioxole.

8. The method of claim 7 in which the polymer is a copolymer of perfluoro-2,2-dimethyl-1,3-dioxole and a complementary amount of at least one monomer selected from the group consisting of tetrafluoroethylene, perfluoromethyl vinyl ether, vinylidene fluoride and chlorotrifluoroethylene.

9. The method of claim 1 in which the polymer is a homopolymer of perfluoro-2,2-dimethyl-1,3-dioxole.

10. The method of claim 1 in which the polymer is a dipolymer of perfluoro-2,2-dimethyl-1,3-dioxole and a complementary amount of tetrafluoroethylene.

11. The method of claim 10 in which the polymer is a dipolymer containing 65-99 mole % of perfluoro-2,2-dimethyl-1,3-dioxole and having a glass transition temperature of at least 140° C.

12. The method of claim 11 in which the membrane has a permeability to oxygen of at least 100 Barrers.

13. The method of claim 12 in which the permeability to oxygen is at least 200 Barrers.

14. The method of claim 12 in which the permeability to oxygen is at least 500 Barrers.

15. A method for the enrichment of the amount of a gas in a gaseous admixture with another gas, said method comprising:
   (a) providing in a membrane separation cell a selectively permeable membrane having a feed side and a permeate side, said membrane being virtually defect-free with an oxygen/nitrogen selectivity of at least 1.4 and formed from an amorphous polymer of perfluoro-2,2-dimethyl-1,3-dioxole, and feeding said admixture to the feed side of said membrane, said membrane being at a temperature of less than the glass transition temperature of the polymer; and
   (b) removing from the permeate side of the membrane, a gaseous admixture that is enriched in the amount of one gas.

16. The method of claim 15 in which a pressure differential is applied across the membrane.

17. The method of claim 15 in which the temperature of the membrane is at least 30° C. lower than the glass transition temperature of the dipolymer.

18. The method of claim 15 in which the polymer is a copolymer of perfluoro-2,2-dimethyl-1,3-dioxole.

19. The method of claim 18 in which the polymer is a copolymer of perfluoro-2,2-dimethyl-1,3-dioxole and a complementary amount of at least one monomer selected from the group consisting of tetrafluoroethylene, perfluoromethyl vinyl ether, vinylidene fluoride and chlorotrifluoroethylene.

20. The method of claim 19 in which the polymer is a dipolymer of perfluoro-2,2-dimethyl-1,3-dioxole and a complementary amount of tetrafluoroethylene.

21. The method of claim 20 in which the polymer is a dipolymer containing 65-99 mole % of perfluoro-2,2-dimethyl-1,3-dioxole and having a glass transition temperature of at least 140° C.

22. The method of claim 15 in which the polymer is a homopolymer of perfluoro-2,2-dimethyl-1,3-dioxole.

23. The method of claim 15 in which the gases are oxygen and nitrogen.

24. The method of claim 15 in which the gaseous admixture is air.

25. The method of claim 15 in which the gases are at least two gases selected from the group consisting of oxygen, nitrogen, hydrogen, helium, methane, ammonia, carbon monoxide and carbon dioxide.

26. The method of claim 15 in which the gases additionally contain water.

27. The method of claim 15 in which the membrane has a permeability to oxygen of at least 100 Barrers.

28. The method of claim 17 in which the permeability to oxygen is at least 200 Barrers.

29. The method of claim 17 in which the permeability to oxygen is at least 500 Barrers.

30. A selectively permeable membrane for the separation of gaseous mixtures comprising a film or coating of an amorphous polymer of perfluoro-2,2-dimethyl-1,3-dioxole on a porous support, said membrane exhibiting an oxygen/nitrogen selectively of at least 1.4.

31. The membrane of claim 30 having a permeability to oxygen of at least 100 Barrers.

32. The membrane of claim 31 in which the permeability to oxygen is at least 200 Barrers.

33. The membrane of claim 31 in which the permeability to oxygen is at least 500 Barrers.

34. The membrane of claim 31 in which the polymer is a copolymer of perfluoro-2,2-dimethyl-1,3-dioxole.

35. The membrane of claim 34 in which the polymer is a copolymer of perfluoro-2,2-dimethyl-1,3-dioxole and a complementary amount of at least one monomer selected from the group consisting of tetrafluoroethylene, perfluoromethyl vinyl ether, vinylidene fluoride and chlorotrifluoroethylene.

36. The membrane of claim 35 in which the polymer is a dipolymer of perfluoro-2,2-dimethyl-1,3-dioxole and a complementary amount of tetrafluoroethylene.

37. The membrane of claim 36 in which the polymer is a dipolymer containing 65-99 mole % of perfluoro-2,2-dimethyl-1,3-dioxole and having a glass transition temperature of at least 140° C.

38. The membrane of claim 30 in which the membrane is monolithic membrane.

39. The membrane of claim 30 in which the membrane is in the form of a hollow fibre.

40. The membrane of claim 30 in which the film or coating and the porous support are different polymers.

41. The membrane of claim 30 in which the polymer is a homopolymer of perfluoro-2,2-dimethyl-1,3-dioxole.

* * * * *

UNITED STATES PATENT OFFICE
CERTIFICATE OF CORRECTION

PATENT NO. : 5,051,114
DATED : November 18, 1991
INVENTOR(S) : Nemser and Roman

It is certified that error appears in the above-identified patent and that said Letters Patent is hereby corrected as shown below:

Column 18, line 46;
In claim 12, replace "11" with -- 1 --.
Column 19, line 37;
In claim 28, replace "17" with -- 27 --.
Column 20, line 1;
In claim 29, replace "17" with -- 27 --.

Signed and Sealed this

Tenth Day of March, 1992

Attest:

HARRY F. MANBECK, JR.

*Attesting Officer*  *Commissioner of Patents and Trademarks*

REEXAMINATION CERTIFICATE (2555th)
United States Patent [19]
Nemser et al.

[11] B1 5,051,114
[45] Certificate Issued May 2, 1995

[54] PERFLUORODIOXOLE MEMBRANES

[75] Inventors: Stuart M. Nemser; Ian C. Roman, both of Wilmington, Del.

[73] Assignees: Du Pont Canada Inc., Mississauga, Canada; E. I. Du Pont de Nemours and Company, Wilmington, Del.

Reexamination Request:
No. 90/002,953, Feb. 4, 1993

Reexamination Certificate for:
Patent No.: 5,051,114
Issued: Sep. 24, 1991
Appl. No.: 538,066
Filed: Jun. 13, 1990

Certificate of Correction issued Mar. 10, 1992.

Related U.S. Application Data

[63] Continuation-in-part of Ser. No. 366,400, Jun. 15, 1989, abandoned.

[51] Int. Cl.$^6$ .................. B01D 53/22; B01D 71/32
[52] U.S. Cl. ................................. 95/47; 95/50; 95/51; 95/53; 95/54; 95/55; 96/10; 96/12

[58] Field of Search .............. 55/16, 68, 158, 524; 526/247; 95/8, 47, 50, 51, 53–55; 96/4, 8–12, 14

[56] References Cited
FOREIGN PATENT DOCUMENTS
63-264101  4/1987  Japan .

*Primary Examiner*—Robert H. Spitzer

[57] ABSTRACT

A selectively permeable membrane for the separation or enrichment of gaseous mixtures may be formed from amorphous polymers of perfluoro-2,2-dimethyl-1,3-dioxole, especially copolymers with a complementary amount of at least one of tetrafluoroethylene, perfluoromethyl vinyl ether, vinylidene fluoride and chlorotrifluoroethylene. Preferably, the polymer is a dipolymer containing 65-99 mole % of perfluoro-2,2-dimethyl-1,3-dioxole and having a glass transition temperature of at least 140° C. The membranes may be used for the separation or enrichment of a wide variety of gaseous mixtures, including oxygen enrichment of air, and separation or enrichment of gaseous organic compounds in admixture with air, including separation or enrichment of the amount of fluorocarbon gases in air. The membranes exhibit a very high flux rate, compared with other glassy organic polymer membranes.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–41 are cancelled.

* * * * *

REEXAMINATION CERTIFICATE (2774th)
United States Patent [19]
Nemser et al.

[11] B1 5,051,114
[45] Certificate Issued Jan. 16, 1996

[54] PERFLUORODIOXOLE MEMBRANES

[75] Inventors: Stuart M. Nemser; Ian C. Roman, both of Wilmington, Del.

[73] Assignees: Du Pont Canada Inc., Mississauga, Canada; E. I. Du Pont de Nemours and Company, Wilmington, Del.

Reexamination Request:
No. 90/002,953, Feb. 4, 1993

Reexamination Certificate for:
Patent No.: 5,051,114
Issued: Sep. 24, 1991
Appl. No.: 538,066
Filed: Jun. 13, 1990

Certificate of Correction issued Mar. 10, 1992.

Related U.S. Application Data

[63] Continuation-in-part of Ser. No. 366,400, Jun. 15, 1989, abandoned.
[51] Int. Cl.[6] .................. B01D 53/22; B01D 71/32
[52] U.S. Cl. .................. 95/47; 95/50; 95/51; 95/53; 95/54; 95/55; 96/10; 96/12
[58] Field of Search .................. 55/16, 68, 158, 55/524; 526/247; 95/8, 47, 50, 51, 53–55; 96/4, 8–12, 14

[56] References Cited
FOREIGN PATENT DOCUMENTS
63-264101  4/1987  Japan .

*Primary Examiner*—Robert Spitzer

[57] ABSTRACT

A selectively permeable membrane for the separation or enrichment of gaseous mixtures may be formed from amorphous polymers of perfluoro-2,2-dimethyl-1,3-dioxide, especially copolymers with a complementary amount of at least one of tetrafluoroethylene, perfluoromethyl vinyl ether, vinylidene fluoride and chlorotrifluoroethylene. Preferably, the polymer is a dipolymer containing 65–99 mole % of perfluoro-2,2-dimethyl-1,3-dioxole and having a glass transition temperature of at least 140° C. The membranes may be used for the separation or enrichment of a wide variety of gaseous mixtures, including oxygen enrichment of air, and separation or enrichment of gaseous organic compounds in admixture with air, including separation or enrichment of the amount of fluorocarbon gases in air. The membranes exhibit a very high flux rate, compared with other glassy organic polymer membranes.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 12, 27 and 30–41 are cancelled.

Claims 1 and 15 are determined to be patentable as amended.

Claims 2–11, 13, 14, 16–26, 28 and 29, dependent on an amended claim, are determined to be patentable.

1. A method for the enrichment of the amount of a gaseous organic compound in a gaseous admixture of said organic compound and at least one of oxygen and nitrogen, said method comprising:
   (a) providing in a membrane separation cell a selectively permeable member having a feed side and a permeate side, said membrane *separation cell* being virtually defect-free with an oxygen/nitrogen selectively of at least 1.4 *and having a permeability to oxygen of at least 100 Barrers* and formed from an amorphous polymer of perfluoro-2,2-dimethyl-1,3-dioxole, and feeding said admixture to the feed side of said membrane, said membrane being at a temperature of less than the glass transition temperature of the polymer; and
   (b) removing from the feed side of the membrane, a gaseous admixture of said organic compound that is enriched in the amount of organic compound.

15. A method for the enrichment of the amount of a gas in a gaseous admixture with another gas, said method comprising:
   (a) providing in a membrane separation cell a selectively permeable membrane having a feed side and a permeate side, said membrane *separation cell* being virtually defect-free with an oxygen/nitrogen selectivity of at least 1.4 *and having a permeability to oxygen of at least 100 Barrers* and formed from an amorphous polymer of perfluoro-2,2-dimethyl-1,3-dioxole, and feeding said admixture to the feed side of said membrane, said membrane being at a temperature of less than the glass transition temperature of the polymer; and
   (b) removing from the permeate side of the membrane a gaseous admixture that is enriched in the amount of one gas.

* * * * *